Patented Aug. 20, 1935

2,012,234

UNITED STATES PATENT OFFICE 2,012,234

PREPARATION OF AROMATIC HYDRAZO COMPOUNDS

Henry J. Weiland, South Milwaukee, Wis., assignor to E. I. du Pont de Nemours & Company, Wilmington, Del., a corporation of Delaware No Drawing. Application March 2, 1934, Serial No. 713,693

3 Claims. (Cl. 260—69)

This invention relates to the preparation of hydrazo compounds of the aromatic series, particularly those which are used in the production of para,para'-diamino-diphenyl bases, such as benzidine, tolidine and dianisidine. More specifically, the invention relates to the separation of these hydrazo compounds from the zinc oxide residues which are formed in the alkaline reduction of the nitro bodies in alcoholic solution with zinc.

In the preparation of these hydrazo compounds by the reduction of a corresponding nitro body, such as nitrobenzene, ortho-nitro-toluene, ortho-nitro-anisole, etc., in alcoholic solution by means of caustic alkalies and zinc, a zinc sludge results which, together with the water immiscible solvent that is used for extracting the hydrazo compound from the reduction mass, under agitation forms a homogeneous non-settling dispersion. Filtering of this dispersion is difficult and impractical due to the physical state of the zinc residues. A method for separating out the hydrazo compounds from the zinc residues has been described, in which the alcohol present in the mass is first distilled and the zinc residues then extracted with a water immiscible solvent in which the hydrazo compound is soluble. While this procedure permits of the recovery of the alcohol in suitable concentrations for reuse in subsequent operations, it necessitates the use of conditions which tend to decrease the yield of the hydrazo compound, for the distillation of the alcohol is carried out while there is still present in the mass an excess of reducing agent, such as the larger particles of zinc, whereby an over-reduction is effected at the distillation temperatures, with a consequent loss in yield of the hydrazo compound. Further destruction of the hydrazo compound results from heating to the distillation temperature even in the absence of a reducing agent, for it is known that the hydrazo compounds are broken down by heat, according to the following formula:

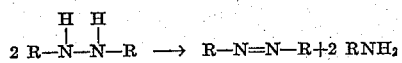

wherein R represents a radical of the benzene series.

I have found that the hydrazo compound may be extracted from the zinc residues, after the reduction is complete, with a water immiscible solvent such as benzene, toluene, solvent naphtha, chlorobenzene, and the like, without first distilling off the alcohol, by effecting a coagulation of the zinc oxide residues in a form in which they readily separate from the liquid portion of the mass when agitation is stopped. I have found that the zinc residues may be coagulated by the addition of quite definite amounts of water to the reduction mass either before or after the addition of the organic solvent used for extracting the hydrazo compound, the water combining with the zinc oxide sludge to put it in a physical form in which it no longer disperses in the organic solvent even under agitation. In the method described in the prior art for the reduction of these nitro bodies in alcohol with caustic soda and zinc, sufficient water is not introduced into the mass to bring about this result. In the case where the water immiscible solvent is first added to the reduction mass, the addition of small amounts of water to the mixture with agitation causes the zinc oxide residues to knead together slightly and upon further addition of water the zinc residues form a very pasty sludge and separate from the solution when the agitation has been stopped. Upon the addition of still further small amounts of water the sludge remains at about the same consistency, but the addition of too large a quantity of water again causes a dispersion of the sludge in the solvent under normal agitation. By coagulating the zinc oxide residues in the reduction mass in this manner, the hydrazo-solvent solution can be readily separated therefrom by settling and decantation, or if desired, the solution may be drawn from the mass and passed through auxiliary settling chambers, or it may be filtered through filters which could not be used economically in the separation of the solvent from the dispersion which is first formed. The actual state of dispersion of the zinc oxide residue in the reduction mass can be tested by removing a portion of the reduction mass and adding water thereto drop by drop until a maximum quick-settling of the zinc oxide occurs. In case too much water has already been added to the mass, the addition of more water will not bring about the desired separation, but water must be removed by evaporation until the residues are in the proper condition for settling.

Instead of using water as such for combining with the zinc oxide residues, dilute alcohol, aqueous caustic soda solutions or dilute acids may be used. It is believed that the phenomenon of settling is related to the condition of hydration of the zinc oxide residue. The proper degree of hydration can be obtained by either adding or removing water, depending upon the amount of water already present in the reduction mass. The solution of the hydrazo compound, after separation from the sludge, may be employed for the preparation of benzidine and related compounds in the known manner, or the hydrazo compound may be crystallized from the solution, if it is desired to obtain it in pure form.

The alcohol present in the extract of water immiscible solvent may be recovered by washing with water to obtain a dilute solution of the alcohol. The solvent for the hydrazo may be recovered after the transformation of the hydrazo compounds to the corresponding diaminodiphenyl compounds by distilling it from the filtered transformation mass, from the transformation mass itself, or from the transformation mass after it has been made alkaline with caustic soda solution. Depending upon the solvent employed, the alcohol may be recovered from the water immiscible solvent during the solvent recovery by forming a constant boiling mixture which can be broken up in the known manner with water, and the alcohol and solvent being thus recovered in technically pure form for reuse.

The following examples are given to more fully illustrate my invention. Parts used are by weight.

*Example 1*

Heat to refluxing 600 parts of nitrobenzene, 450 parts of denatured alcohol (methyl denatured) and 29.5 parts of caustic soda as a 37° Bé. solution. Add 845 parts of zinc dust gradually, as fast as the reduction permits, over a period of 4-6 hours. When complete, the reaction mixture will have changed to a greyish-white shade. Add 2000 parts of toluene while stirring slowly, maintaining the temperature close to reflux. Then add water in 25 part portions until the zinc sludge is fully coagulated. This requires 200-225 parts of water. The toluene layer containing the hydrazo can then be easily drawn off from the zinc oxide sludge.

*Example 2*

730 parts of ortho-nitro-anisole and 480 parts of denatured alcohol are reduced at reflux temperature by charging intermittently 78 parts of 40° Bé. caustic soda, and 925 parts of 95% zinc dust. When the reduction is finished, the hydrazo may be separated in benzene solution from the zinc oxide as follows: Cool to 60° C., add 2000 parts of benzene, then add with slow agitation 190-300 parts of water in 25 part portions. This coagulates the zinc oxide sludge, and facilitates decantation. Water in excess of 350 parts will cause the zinc oxide to disperse through the benzene solution.

*Example 3*

The reduction can be made as in Example 2, using 656 parts of ortho-nitro-toluene. The hydrazo can be extracted with 3° xylene after coagulation of the zinc with 175-400 parts of water added in 25 part portions while slowly agitating. Water in excess of 450 parts again disperses the zinc oxide.

I claim:

1. In the process of separating the hydrazo body from a reduction mass resulting from the alkaline reduction of nitro aromatic bodies with alcohol, caustic alkali and zinc dust and in which the hydrazo compound is extracted from the zinc residues by a water immiscible solvent, the step which consists of coagulating the zinc residues by the use of an aqueous diluent, without previously removing the alcohol.

2. In the process of separating the hydrazo body from a reduction mass resulting from the alkaline reduction of nitro aromatic compounds with alcohol, caustic alkali and zinc dust, the steps which comprise adding to the reduction mass a solvent for the hydrazo compound which is immiscible in water, without removing alcohol, coagulating the zinc residue by the use of an aqueous diluent and separating off the solution of the hydrazo in the water immiscible solvent.

3. In the process of separating the hydrazo body from a reduction mass resulting from the alkaline reduction of nitro aromatic bodies with alcohol, caustic alkali and zinc dust and in which the hydrazo compound is extracted from the zinc residues by a water immiscible solvent, the step which consists of coagulating the zinc residues by careful adjustment of the water content of the mass without previously removing the alcohol.

HENRY J. WEILAND.